United States Patent Office 3,244,517
Patented Apr. 5, 1966

3,244,517
ELECTROPHOTOGRAPHIC PROCESS
Erwin Lind, Wiesbaden-Biebrich, Germany, assignor, by mesne assignments, to Azoplate Corporation, Murray Hill, N.J., a corporation of New Jersey
No Drawing. Filed Sept. 5, 1961, Ser. No. 135,788
Claims priority, application Germany, Sept. 17, 1960, K 41,699
8 Claims. (Cl. 96—1)

Electrophotographic material, in which the photoconductive coating contains inorganic photoconductors applied together with a binder, is known. These photoconductor coatings have the disadvantage that they are not sufficiently transparent for images produced therewith to be used directly for further copying on light-sensitive material. Also, organic photoconductor coatings have been used for the preparation of electrophotographic material. These, however, often have insufficient light-sensitivity or, if they are of low molecular weight, have an undesirable tendency towards crystallization.

An electrophotographic material has now been found which consists of a support with a photoconductive coating, the latter consisting, at least in part, of a condensation product of an aldehyde and an aromatic amine, which latter may be substituted.

Some of the condensation products to be used in accordance with the invention are known. Reference is made to R. S. Morell's general survey, "Synthetic Resins and Allied Plastics," 3rd edition (1951), pages 392–395, and "British Plastics" (1931), 3, p. 292, and (1935) 6, p. 356.

Suitable aldehydes include aliphatic aldehydes such as formaldehyde, acetaldehyde, acrolein, propionaldehyde and crotonaldehyde, and aromatic aldehydes such as benzaldehyde, naphthaldehyde, terephthaldehyde and furfural. Formaldehyde is particularly suitable.

Examples of aromatic amines that may be used are: aniline, substituted aniline such as fluoraniline, 4-bromaniline, 4-chloraniline, toluidine, naphthylamine and naphthylamine substituted on the nitrogen by lower alkyl.

For the preparation of the products, the starting materials are mixed together, where necessary dissolved in a solvent, at normal or elevated temperatures, preferably at temperatures of from 80 to 150° C., generally in the presence of a catalyst, preferably an acid catalyst, but alkaline catalysts, such as potassium or sodium hydroxide, are also useful. Suitable acid catalysts are: organic acids such as phthalic acid, terephthalic acid and mellitic acid, and inorganic acids such as hydrochloric acid, sulfuric acid and phosphoric acid.

A number of the condensation products are known, e.g., products from aniline and formaldehyde (see German Patent 613,264 and the survey in "Chemische Technik" (1935), vol. 59, p. 107). The condensation of toluidine with formaldehyde is described in British Patents 266,358 and 274,501. The mixed condensation of a mononuclear aromatic amine with naphthylamine and formaldehyde is described in German Patent 305,026. The condensation of aniline with benzaldehyde is described in German Patent 401,726.

The preparation of certain of the compounds is described by way of example below.

A condensation product of 4-fluoraniline and formaldehyde is obtained as follows: 50 parts by weight of 4-fluoraniline, 19 parts by volume of a 40% formaldehyde solution and 19 parts by volume of concentrated hydrochloric acid are heated for six hours on a steam bath. The solution is then made alkaline with sodium carbonate. The resin which precipitates out is taken up in chloroform, separated from the aqueous phase, dried with potassium carbonate, and the solvent is distilled off. A small quantity of 4-fluoraniline that remains unreacted is separated by vacuum distillation. The condensation product is a brown resin which is readily soluble in ethyl acetate and has a softening temperature of 70–80° C.

The 4-bromaniline formaldehyde condensation product is prepared in an exactly analogous manner from 91 parts by weight of 4-bromaniline, 19 parts by volume of 40% formaldehyde solution, and 19 parts by volume of concentrated hydrochloric acid. The resulting brown resin has a softening temperature of 110–120° C. and is readily soluble in ethyl acetate.

In the same manner, the 4-chloraniline formaldehyde condensation product can be prepared from 64 parts by weight of 4-chloraniline, 19 parts by volume of 40% formaldehyde solution and 19 parts by volume of concentrated hydrochloric acid. It is likewise brown in color and is readily soluble in ethyl acetate.

For the preparation of the condensation product of N-ethylaniline and formaldehyde, the most satisfactory method is a two-stage process. First, 726 parts by weight of N-ethylaniline and 225 parts by weight of 40% formaldehyde solution, with the addition of 3 parts by volume of 2N sodium hydroxide solution, are stirred together for three days at room temperature. The N,N'-diethyl-N,N'-diphenylmethylene diamine that crystallizes out is filtered off. It forms colorless crystals which melt at 79° C.

After 245 parts by weight of N,N'-diethyl-N,N'-diphenylmethylene diamine, 90 parts by volume of formaldehyde, and 240 parts by volume of concentrated hydrochloric acid have been heated together on a steam bath for six hours, a condensation product is obtained. This is separated from the aqueous phase by adjustment of the pH to a value greater than 7, by means of sodium carbonate solution, and extraction with chloroform. After drying and removal of the chloroform, the residue is heated in vacuo so that the components of lower molecular weight are distilled off. An amber-yellow resin having a softening temperature of about 90–100° C. is obtained.

For the preparation of the condensation product of N-propylaniline and formaldehyde, a mixture of 260 parts by weight of N-propylaniline, 150 parts by weight of 40% formadlehyde solution and 240 parts by volume of concentrated hydrochloric acid is heated on a steam bath for six hours. The working up and isolation of the resin is as in the case of the condensation product of N-ethylaniline and formaldehyde. In the same manner, the condensation product of N-butylaniline and formaldehyde is obtained from 149 parts by weight of N-butylaniline, 82 parts by weight of 40% formaldehyde solution and 100 parts by volume of concentrated hydrochloric acid. The condensation products are dark yellow resins which are readily soluble in ethyl acetate.

For the preparation of the condensation product of β-naphthylamine and formaldehyde, a mixture of 30 parts by weight of β-naphthylamine, and 19 parts by volume of 40% formaldehyde solution is heated for eight hours on a steam bath; excess β-naphthylamine is distilled off in vacuo. A brown resin remains which, upon cooling, solidifies to a solid substance having a softening temperature of 60–65° C.

From α-N-ethyl naphthylamine and formaldehyde a condensation product is obtained if a mixture of 342 parts by weight of α-N-ethyl naphthylamine, 100 parts by weight of 40% formaldehyde solution, and 80 parts by volume of concentrated hydrochloric acid is heated on a steam bath for six hours. Sufficient sodium carbonate is added to make the solution alkaline and then the resin is extracted with chloroform. The chloroform solution is separated, dried with potassium carbonate and the chloroform is distilled off. A dark brown resin remains which has a softening temperature of 55° C. and is readily soluble in ethyl acetate.

A condensation product of N-methyl-1,3-toluidine with formaldehyde is obtained when 364 parts by weight of N-methyl-1,3-toluidine, mixed with 160 parts by weight of 40% formaldehyde solution and 120 parts by volume of concentrated hydrochloric acid, are heated for six hours on a steam bath. Isolation of the resin is effected by extraction with chloroform, as described above. A dark yellow resin is obtained which has a softening point of 90° C. and is readily soluble in ethyl acetate.

The condensation product from N-ethyl-1,4-toluidine is prepared in an exactly analogous manner. It is a brown resin having a softening point of 102° C.

A condensation product is obtained from $\alpha$-naphthylamine and acetaldehyde by adding 4.5 parts by weight of acetaldehyde at a temperature of 10° C., with stirring, to 14.5 parts by weight of $\alpha$-naphthylamine dissolved in 450 parts by volume of benzene and permitting the mixture to stand at room temperature for 24 hours. When the benzene has been distilled off, unreacted starting material is removed from the residue by vacuum distillation. A brown resin with a softening point of 80° C. is obtained.

A condensation product is obtained from ortho-toluidine and acetaldehyde by mixing 22 parts by weight of acetaldehyde with 18.4 parts by weight of concentrated sulfuric acid into which mixture 90 parts by weight of water are mixed and then, with stirring, 23 parts by weight of ortho-toluidine. The solution is first heated to boiling and then permitted to stand for a few minutes at about 95° C. After the solution has been poured into 1500 parts by weight of cold water and neutralized with sodium hydroxide, the precipitated condensation product is filtered off, washed with water and dried. A dark yellow resin is obtained which has a softening temperature ranging from 60 to 80° C. and is readily soluble in ethyl acetate.

A condensation product of aniline with crotonaldehyde is obtained if 70 parts by weight of crotonaldehyde are mixed with 93 parts by weight of aniline at 50° C., the mixture is stirred at this temperature for three hours, and allowed to stand for twelve hours. Unreacted starting material is removed by vacuum distillation. The residue obtained is a brown resin which is readily soluble in ethyl acetate.

For the preparation of a condensation product from $\alpha$-naphthylamine and crotonaldehyde, 38 parts by weight of $\alpha$-naphthylamine are added at a temperature of 50° C., with stirring, to 18 parts by weight of crotonaldehyde. Stirring is continued at this temperature for three hours and then the mixture is allowed to stand for twelve hours at room temperature. Unreacted starting materials are removed by vacuum distillation. The residue is a brown resin which is readily soluble in ethyl acetate and softens at a temperature in the range of 100 to 170° C.

A condensation product of ortho-toluidine and crotonaldehyde is obtained by adding 21.4 parts by weight of ortho-toluidine, dropwise at 50° C., with stirring, to 14 parts by weight of crotonaldehyde; stirring is continued for three hours and, after the resultant mixture has been allowed to stand for twelve hours, unreacted starting material is distilled off in vacuo. The residue is a brown resin which softens at a temperature in the range of 100 to 120° C.

In an analogous manner, a condensation product of N-ethylaniline and crotonaldehyde is obtained from 121 parts by weight of N-ethylaniline and 70 parts by weight of crotonaldehyde. Similarly, a condensation product is obtained from 42.7 parts by weight of $\alpha$-N-ethylnaphthylamine and 17.5 parts by weight of crotonaldehyde. The resulting resins are brown in color and soften at a temperature of about 100° C.

A condensation product of aniline and furfural is obtained by heating 93 parts by weight of aniline and 96 parts by weight of furfural under reflux for one hour to a temperature of 170° C. A dark brown resin is obtained which softens at a temperature between 75 and 90° C. and is soluble in dimethyl formamide.

A condensation product of N-ethylaniline and furfural is obtained in an analogous manner from 121 parts by weight of N-ethylaniline and 96 parts by weight of furfural. The resulting resin is dark brown and softens at a temperature between 75 and 90° C.

Mixed condensates can also be obtained by the method described above if more than one amine and one aldehyde is used.

For their employment as photoconductor coatings in electrophotography, the condensation products described above are advantageously applied to a supporting material from organic solvents or in the form of a dispersion, e.g., the solution or dispersion is cast, brushed or sprayed upon a support and the solvent is then evaporated.

As supports, those commonly employed in electrophotography may be used. Preferred are foils made of metal, e.g., aluminum, zinc and copper; cellulose products such as paper, and cellulose hydrates; plastics such as polyvinyl alcohol, polyamides and polyurethanes, and other plastics such as cellulose acetate and cellulose butyrate—particularly in partially saponified form—polyesters, polycarbonates and polyolefins, if they are covered with an electrically conductive coating or if they have been converted into materials which have a specific resistance of at least $10^{12}$ ohm-cm., e.g., by chemical treatment or by incorporation therein or application thereto of materials which render them electrically conductive. Glass plates may also be used.

In this way photoconductive coatings of exceptional uniformity are obtained, with which copies can be prepared electrophotographically in known manner, by electrostatic charging with a corona discharge, illumination through an image and development, e.g., with an electroscopic powder, and subsequent fixing.

It has hitherto been recognized as advisable, when paper is to be the support for the photoconductive layer, for specially pretreated papers to be used which are resistant to penetration by organic solvents. The condensation products of the invention can be applied in the form of solutions in organic solvents to untreated base papers without any undue penetration of the coating solution.

The light-sensitivity of the photoconductor coatings can be increased if optical sensitizers are incorporated therein. For the sensitizing dyestuffs listed below, by way of example, the appropriate page and number in the "Farbstofftabellen" by G. Schultz, 7th edition, 1931, vol. I, is given:

Triarylmethane dyestuffs such as Brilliant Green (No. 760, p. 314), Victoria Blue B (No. 822, p. 347), Methyl Violet (No. 783, p. 327), Ethyl Violet (No. 787, p. 331), Crystal Violet (No. 785, p. 329), Acid Violet 6 B (No. 831, p. 351); xanthene dyestuffs, particularly rhodamines such as Rhodamine B (No. 864, p. 365), Rhodamine 6 G (No. 866, p. 366), Rhodamine G extra (No. 865, p. 366), Sulforhodamine B (No. 863, p. 364) and Fast Acid Eosin G (No. 870, p. 368), as also phthaleins such as Eosin S (No. 883, p. 376), Eosin A (No. 881, p. 374), Erythrosin (No. 886, p. 376), Phloxin (No. 890, p. 378), Bengal Rose (No. 889, p. 378), and Fluorescein (No. 880, p. 373); thiazine dyestuffs such as Methylene Blue (No. 1038, p. 447); acridine dyestuffs such as Acridine Yellow (No. 901, p. 383), Acridine Orange (No. 908, p. 387) and Trypaflavine (No. 906, p. 386); quinoline dyestuffs such as Pinacyanol (No. 924, p. 396) and Cryptocyanine (No. 927, p. 397); quinone dyestuffs and ketone dyestuffs such as Alizarin (No. 1141, p. 499) Alizarin Red S (No. 1145, p. 502) and Quinizarine (No. 1148, p. 504); and cyanine dyestuffs, e.g., Cyanine (No. 921, p. 394) and chlorophyll.

Also a general increase in light-sensitivity is obtained if small quantities of activators are added.

Such activators are organic compounds which are capable of acting as electron acceptors in molecule complexes of the donor/acceptor type ($\pi$-complex) (charge-transfer complex). They are compounds with a high electron affinity and are acids in the sense of Lewis' definition. A definition of Lewis acids is given in Kortüm's "Lehrbuch der Electrochemie," 1948, p. 300. Substances of this type contain powerfully polarizing residues or groups, such as the cyano, nitro, keto, ester or acid anhydride group, or acid groups, such as carboxyl groups, or halogens, such as chlorine, bromine, and iodine, or the quinone configuration. Polarizing, electron-attracting groups of this type are described in the "Lehrbuch der organischen Chemie," by L. F. and M. Fieser, 1950, p. 651, Table 1.

Activators which are preferred are those having a melting point above room temperature because the action of these compounds remains unaltered, even after prolonged storage, as a result of their generally low vapor pressure. Compounds which are moderately colored, such as quinones, may be used but compounds having little or no color are preferable as are those having an absorption maximum in the ultra-violet region of the spectrum below 4500 A. Also, the activator compounds should be of lower molecular weight, i.e., between 50 and 5000, preferably between 100 and 1000.

Examples of activators which act as electron-acceptors are: 1,2-dibromo-maleic anhydride, chloranil, dichloro-acetic acid, 1,2-benzanthraquinone, 2,4,7-trinitro-fluorenone, 1,3,5 - trinitro - benzene, tetrachloro - phthalic anhydride, hexabromo-naphthalic anhydride, and tetracyanoethylene.

Additives such as plasticizers, resins, e.g., ketone resins, or pigments, such as titanium dioxide, may also be added to the photoconductor coatings.

For the preparation of electrophotographic images, the photoconductor coating is provided with a positive or negative charge by means of a corona discharge of several thousand volts and is then illuminated through a master or by episcopic or diascopic projection. The resulting electrostatic latent image is developed by dusting over with a pigmented resin powder. The developed, pigmented images can be fixed by heating to temperatures at which the resin employed melts, i.e. about 100 to 150° C., preferably 110 to 125° C. The heat treatment is advantageously effected by infra-red radiation. The fixing temperature can be reduced if the material is simultaneously exposed to vapor of agents capable of dissolving or swelling the resins in question. Solvents of this type are primarily halogenated hydrocarbons such as trichloroethylene or carbon tetrachloride or saturated lower alcohols such as ethanol and propanol. By the method described above, images corresponding to the masters, with good contrast, are obtained. These can also be used for the preparation of printing plates; for this purpose, the images are wiped over with a suitable solvent, moistened with water, and inked up with greasy ink. In this way, printing plates corresponding to the master are obtained with which copies can be produced in an offset machine.

The photoconductor coatings described above can be used both in reproduction processes and in measuring processes for recording purposes, e.g., photographic recording instruments.

The photoconductor coatings of the invention have the advantage that paper used as a support does not need to be impregnated as a protection against the penetration of organic solvents. The photoconductor coatings can be applied in the form of solutions in organic solvents to a paper base that has not been pretreated because no excessive penetration of the coating solution occurs. They have the further advantage over coatings hitherto known in that they are soluble in acids. This property enables printing plates to be prepared from the developed images. The coating is dissolved away from the image-free parts with a dilute acid and the hydrophilic surface of the support is bared. If a transparent supporting material is used in the process, images corresponding to the master are produced on a clear support; these are excellent for further reproduction by any process. When the substances hitherto known, such as selenium or zinc oxide, are used the background is cloudy so that unsatisfactory results are obtained when secondary copies are made.

The invention will be further illustrated by reference to the following specific examples:

*Example I*

For the preparation of an electrophotographic material using a photoconductor coating of the invention, 2 parts by weight of a condensation product of N-ethylaniline and formaldehyde are dissolved in 30 parts by volume of ethyl acetate; one part by volume of a 1% solution of Rhodamine B is added. The solution is applied to a paper printing foil. After evaporation of the solvent, a coating remains which adheres firmly to the surface of the paper. By the electrophotographic process, images are produced from masters on the coated paper which are developed and fixed in known manner. These images can be converted into printing plates if the paper is wiped over with 5% phosphoric acid, rinsed well with water and inked up with greasy ink in the presence of 1% phosphoric acid. In this way, positive printing plates are obtained which can be set up in an offset machine and used for printing.

*Example II*

36 parts by weight of a condensation product of $\alpha$-naphthylamine with acetaldehyde are dissolved in 290 parts by volume of ethyl acetate. 18 parts by volume of a 0.01 molar solution of dibromo-succinic acid in ethyl acetate are added. The solution is applied to an aluminum foil the surface of which has been cleaned free of grease. After the coating has dried, an image is electrophotographically produced from a master on the coated foil; it is developed by powder treatment and fixed by heat. A printing plate is produced if the image side of the aluminum foil is wiped over with a mixture of 5% phosphoric acid and 96% alcohol in equal proportions, rinsed well with water, and inked up with greasy ink in the presence of 1% phosphoric acid. A positive printing plate is obtained which can be set up in an offset machine and used for printing.

*Example III*

2 parts by weight of a condensation product of aniline with furfural are dissolved in 30 parts by volume of ethyl acetate. This solution is coated upon a paper the surface of which has been pretreated against the penetration of organic solvents. After drying is completed, images can be produced on the paper by the electrophotographic process. These can be developed by powder treatment and fixed with heat.

*Example IV*

A solution of 2 parts by weight of a condensation product of $\alpha$-naphthylamine with crotonaldehyde in 30 parts by volume of ethyl acetate is applied to an aluminum foil. After drying is completed, images can be electrophotographically produced on the coated foil. After being fixed, these can be converted into printing plates if the foil is wiped over with a mixture of 5% aqueous phosphoric acid and 96% alcohol in equal proportions, rinsed well with water and inked up with greasy ink in the presence of 1% phosphoric acid. Positive printing plates are obtained which when set up in an offset machine will give a very long run of prints.

*Example V*

7 parts by weight of a condensation product of N-methyl-1,3-toluidine with formaldehyde are dissolved in 30 parts by volume of ethyl acetate and the solution is applied to a transparent paper. When drying is completed, images are produced by the electrophotographic process, developed by powder treatment, and fixed by heat. In this way transparent intermediate originals are obtained which are suitable for the preparation of additional copies, e.g., by photoprinting.

It will be obvious to those skilled in the art that many modifications may be made within the scope of the present invention without departing from the spirit thereof, and the invention includes all such modifications.

What is claimed is:

1. A photographic reproduction process which comprises exposing an electrostatically charged, supported photoconductive insulating layer to light under a master and developing the resulting image with an electroscopic material, the photoconductor consisting essentially of a resinous condensation product of a saturated aldehyde and an aromatic amine.

2. A process according to claim 1 in which the photoconductive layer contains a dyestuff sensitizer.

3. A process according to claim 1 in which the photoconductive layer contains an activator.

4. A process according to claim 1 in which the condensation product is of formaldehyde and N-ethylaniline.

5. A process according to claim 1 in which the condensation product is of acetaldehyde and α-naphthylamine.

6. A process according to claim 1 in which the condensation product is of furfural and aniline.

7. A process according to claim 1 in which the condensation product is of formaldehyde and N-methyl-1,3-toluidine.

8. An electrophotographic process comprising the steps of exposing an electrostatically charged photoconductive insulating layer to a light pattern to form an electrostatic image on said layer and developing the image on said layer by applying electrostatically attractable particulate material, said photoconductive insulating layer comprising the polymeric condensation product of formaldehyde with a polynuclear fused ring aryl amine having at least one hydrogen atom attached to the nitrogen atom of the amine group.

References Cited by the Examiner

UNITED STATES PATENTS

| | | | |
|---|---|---|---|
| 1,587,269 | 6/1926 | Beebe et al. | 260—72.5 |
| 1,587,272 | 6/1926 | Beebe et al. | 260—72.5 |
| 1,587,273 | 6/1926 | Beebe et al. | 96—115 |
| 1,587,274 | 6/1926 | Beebe et al. | 96—115 |
| 1,777,140 | 9/1930 | Hildebrand | 260—72.5 |
| 1,939,691 | 12/1933 | Haller | 260—72.5 |
| 2,997,387 | 8/1961 | Tanenbaum | 96—1 |
| 3,041,165 | 6/1962 | Sus et al. | 96—1 |
| 3,081,165 | 3/1963 | Ebert | 96—1 |
| 3,163,531 | 12/1964 | Schlesinger | 96—1 |

FOREIGN PATENTS 562,336   5/1958   Belgium.

NORMAN G. TORCHIN, *Primary Examiner.*

ABRAHAM H. WINKELSTEIN, A. LOUIS MONACELL, *Examiners.*

C. VAN HORN, *Assistant Examiner.*